United States Patent [19]

Gloton

[11] Patent Number: 5,031,109

[45] Date of Patent: Jul. 9, 1991

[54] SYSTEM FOR CONTROLLING A WANDERING ROBOT

[75] Inventor: Jean-Pierre Gloton, Aix en Provence, France

[73] Assignee: Gemplus Card International, France

[21] Appl. No.: 569,960

[22] Filed: Aug. 20, 1990

Related U.S. Application Data

[63] Continuation of Ser. No. 279,060, Dec. 1, 1988, abandoned.

[30] Foreign Application Priority Data

Dec. 14, 1987 [FR] France .................................. 87 17388

[51] Int. Cl.$^5$ .......................... G05B 19/18; B25J 9/16
[52] U.S. Cl. .................................. 364/478; 364/513; 364/424.02; 901/50; 414/909
[58] Field of Search .................... 364/513, 424.02, 468, 364/478; 414/909; 901/50; 318/568.12

[56] References Cited

U.S. PATENT DOCUMENTS

| | | | |
|---|---|---|---|
| 4,467,436 | 9/1984 | Chance et al. | 364/133 |
| 4,674,048 | 6/1987 | Okumura | 318/568.12 |
| 4,942,512 | 7/1990 | Kohno | 364/513 |

Primary Examiner—Jerry Smith
Assistant Examiner—Paul Gordon
Attorney, Agent, or Firm—Roland Plottel

[57] ABSTRACT

To program a robot, without requiring action by specially qualified staff, electronic cards (called chip cards) are used. A handling workman stacks chip cards in an automatic distributor. These chip cards correspond to a set of tasks to be performed. The robot is designed to come and stand in queue before this distributor to receive the chip card which is located at the bottom of the stack and has the program of instructions which it has to carry out.

8 Claims, 1 Drawing Sheet

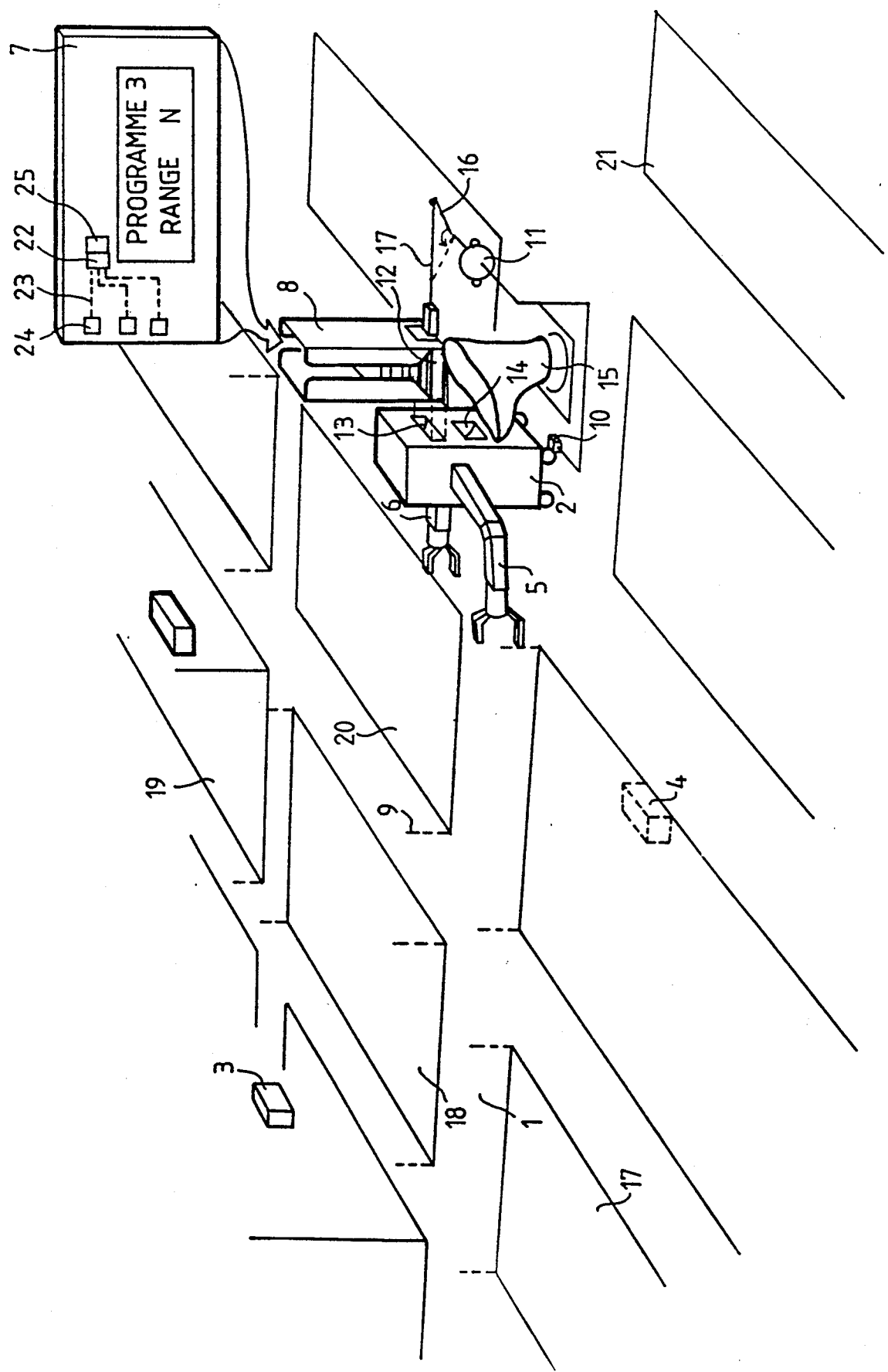

SYSTEM FOR CONTROLLING A WANDERING ROBOT

This application is a continuation of application Ser. No. 071279,060, filed Dec. 1, 1988 and now abandoned.

BACKGROUND OF THE INVENTION

1. Field of the Invention

An object of the present invention is a system for controlling a robot. It concerns, more particularly, robots for which the control is of the electronic type. The use of robots of this type is becoming widespread, especially for the handling of articles stored in warehouses. The invention is essentially aimed at making it easier for personnel, in principle unskilled, to manage and use robots of this type.

2. Description of the Prior Art

There are, for example, known handling robots which have the task of taking objects from a store, conveying them and putting them down at another place where they are designed to be taken up for distribution to a consignee or customer. There are two types of automated installations to control these robots. In a first type of installation, the warehouse is laid out so that electrical wires are embedded in the positions through which the robot passes. These wires are designed to supply power this robot as well as to control it. The drawback of installations of this type is that they are not flexible: they cannot be easily modified or complemented and, moreover, they are costly. For, they call for a major infrastructure in the warehouses. This infrastructure is far more demanding than the mere setting up of smooth surfaces on the ground of the warehouse to enable the robots to move about. In another, more flexible, type of installation, the robots are remote controlled by electromagnetic waves. While this latter type of installation is less costly, it has numerous disadvantages: essentially, the electromagnetic waves cannot be propagated efficiently in every industrial environment. It is not certain that the performance instructions to the robots will be transmitted.

Irrespective of the system for transmitting instructions to the robot, another problem appears. This problem relates to the qualifications of the workmen entrusted with managing the robots. With some of them, these qualifications are inadequate. In practice, these workmen are not capable of dictating the instructions to be carried out by the robots, even in a highly developed computer language. The result of this is that the workmen assigned to tasks of this type should be more qualified. This entails greater wage costs.

Furthermore, if there is an automatic installation designed to handle several robots, it becomes necessary to perfect the definition of a complicated system to manage all these robots. This definition takes a great deal of time. Of itself, it necessitates the centralization of the control of the robots and, to an even greater extent, it warrants the appointment of qualified workment to manage operations which are not very complicated in themselves and could normally be performed by handlers. The subsequent modification of this complicated system is itself a complicated process. Choosing a centralized management mode of this type ultimately implies the choice of a system whose development will always be hindered by its specific character.

An object of the invention is to cope with these drawbacks by proposing a robot controlling system with a universal character, wherein the robots come and get served by an automatic distributor. From this distributor, they take up electronic cards, called chip cards, having a memorized program of instructions to be carried out by this robot. Then, the handlers' task is simply, depending on the job commands to be carried out, to stack, in the distributor, those memory electronic cards corresponding to the chronology of these commands. To make their task easier, these memory cards, which are substantially flat, have a location on one their faces, designed to receive understandable indications. These indications may, if necessary, symbolically represent the program to be carried out. The recording of the programs in the chip cards simplifies the handlers' work. The reading of the instruction programs contained in these cards, by a card reader carried by the robot, then provides for the simple transmission of the instructions to be carried out. For its movements, the robot may then make use of markers placed in its path.

SUMMARY OF THE INVENTION

An object of the invention, therefore, is a robot controlling system comprising means to record programs of instructions and means to transmit these programs of instructions to the robot and comprising, in the robot, means to receive these programs of instructions and means to carry these instructions out, said system having in the means to record these instructions so-called chip cards, each of said chip cards being provided with a microprocessor.

BRIEF DESCRIPTION OF THE DRAWINGS

The invention will be better understood from the following description and the accompanying Figure. The Figure and description are given purely, by way of indication and in no way restrict the scope of the invention.

DESCRIPTION OF A PREFERRED EMBODIMENT

The single FIG. 1 shows, by way of an example, a schematic view of an automated handling installation wherein the handling tasks are performed by a robot.

In an installation having traffic lanes such as 1, a robot 2 is made to move and take up objects 3 at places chosen according to a program, and to come and place these objects at locations 4, from which they will be subsequently taken up. To this end, the robot has handling arms such as 5 and 6. The invention is characterized by the fact that the programs of instructions to be accomplished by the robot are stored in electronic cards, called chip cards, such as the card 7. These cards are stacked by a handling management operator, in an automatic card distributor.

The installation works as follow: when the robot 2 has performed all the tasks programmed in it, in particular by identifying its position through markers such as 9 located at characteristic positions in the storage area, it approaches the distributor 8. In approaching the distributor 8, it activates a pedal 10, located near this distributor 8. This pedal 10 causes the starting up of a motor 11 for the insertion of a new chip card 12 in a chip card reader 13 which is joined to the robot 2. When this insertion is taking place, the robot can discard a previous chip card (the instructions of which it has already carried out) through a hatch 14, into a recovery tray 15. To enable insertion, the distributor has a trigger 16, for example, which drives an insertion rod 17. The rod 17 pushes the end of the chip card, which is at the bottom of the stack contained in the distributor 8, in order to insert this card.

The value of the approach according to the invention is seen especially when the installation is a complicated one, when it is designed to work with several robots. For, the next robot which approaches the distributor 8 removes the new card which is at the base of this stack, so that the distribution of tasks among the different robots takes place without the handler's having to assess the time for the execution of each task, and without his having to assign a certain amount of work to one robot rather than to another one, at the risk of making a mistake and wasting time.

Moreover, a robot may meet with difficulties while executing the instructions of the program contained in its chip card. For example, access by one of the lanes to a position of the storage area may be blocked, for example by the presence of another robot, which is already performing operations on this lane. In this case, it may be decided to postpone an instruction, that has to be carried out, to after the execution of another instruction which, for its part, can be carried out. For example, this instruction can be carried out because it requires the use a traffic lane which is not blocked by another robot. This non-executed instruction can then be kept in memory to be carried out at the end of all the instructions comprising the program. However, this approach may have two drawbacks. Firstly, the pre-recorded program may have to be designed so as to optimize the movements of the robot and, therefore, the performance of automatic tasks. The fact of causing certain tasks to be skipped over and of repositioning them, when they are omitted, at the end of the list of instructions to be carried out by the program may cause considerable loss of efficiency in the performance of this program. Furthermore, certain operations should not be performed after certain other operations: for example, it is not advisable to load heavy objects on top of breakable objects.

The simplest way to overcome these drawbacks may be to wait for the traffic lane, blocked by the robot, to become free. In the invention, it has been discovered that advantage can be taken of the fact that chip cards generally comprise a memory (to contain the instructions of the program) and also a microprocessor. This microprocessor may then take into account constraints in the execution of the program or programs recorded therein. These constraints are essentially related to the effective progress of the program, and make it possible to optimize the performance of those tasks which had to be omitted because their execution had been made impossible for the time being. In brief, rather than gradually replacing the organized progress of the instructions executed by a disorderly development resulting from effective constraints in execution, the microprocessor may make it possible, by means of a recorded program, to again optimize the progress of this execution in the light of the actual situation.

Let us assume, for example, that the storage area has neighbouring zones and that the program of the robot consists in conveying objects, located in an area 17 to an area 18 neighbouring this area 17, objects located in an area 18 to an area 19 neighbouring this area 18 and so on. If, for example, it is impossible, for the time being, to transfer the objects contained in the area 18 to the area 19, it may be useful to wait for the robot to get repositioned in an area 20 close to the area 18 to perform these tasks which have not been performed. This is preferable to the method of waiting for the robot to complete its rounds and for it to be at the other end of the warehouse, for example near an area 21. In this case, the loss of time corresponds to the time taken by this robot to travel from the area 21 to the area 18. It is possible, for example, to conceive of an optimizing program which requires the order numbers of the areas to be visited should not too different from one another, between one instruction to another. To this end, the chip cards 7 therefore have storage zones 22 to exchange information with the robot 2 and communicate the instructions to be carried out to this robot 2, by means of connections such as 23 and contact metallizations 24 that appear at the surface of these cards. The cards also have a microprocessor 25 entrusted with managing the optimization of the performance of tasks. The use of these memory cards can be further improved by increasing the interactivity of these cards with the robot: with recording functions of its reader 13 (which is then a reader/recorder) the robot may introduce, into the memory zone 22 of the card 7, information on the conditions of the performance of its task, namely information such as the temperature of the storage area, the duration of the elementary transport operations etc. After the removal of the cards from the recovery tray 15, it is possible to process the data contained in them.

To facilitate the operator's task, the cards may have clearly formulated indications on one of their faces (preferably on the face intended to be turned upwards in the stack). These indications, for example "PROGRAM 3 - ROW N", give information on the nature of the program recorded in the card. These indications may also be replaced by logotypes.

What is claimed is:

1. A control system for a wandering robot, comprising means to record programs of instructions and to transmit these recorded programs of instructions to the robot, said robot comprising means to receive these recorded programs of instructions and means to carry these instructions out, said system having smart cards in the means to record and to transmit these recorded instructions on cards, each of said smart cards being provided with a chip having a storage zone for recording said recorded programs of instructions and a microprocessor unit designed to organize the execution of said instructions by the robot, said receiving means comprising a chip card reader.

2. A system according to claim 1, wherein the cards are flat and have, on at least one of their surfaces, a location to receive indications, understandable by human beings, in order to represent the program to be accomplished.

3. A system according to claim 1 or 2 wherein it further comprises markers placed on a path of said robot and in this robot, means for identifying the position of this robot with respect to these markers.

4. A system according to claim 3 wherein said transmitting means comprising an automatic card distributor to work together with the receiving means, said distributor having means to place the programs to be accomplished by the robot in queue.

5. A system according to claim 1 or 2, wherein it comprises means for recording conditions of carrying out of the instructions after these instructions have been carried out.

6. A system according to claim 5 wherein said transmitting means comprising an automatic card distributor to work together with the receiving means, said distributor having means to place the programs to be accomplished by the robot in queue.

7. A system according to claim 5, wherein a distributor has means to place programs to be accomplished by robot in queue.

8. A system according to claim 1 or 2 wherein said transmitting means comprising an automatic card distributor to work together with the receiving means, said distributor having means to place the programs to be accomplished by the robot in queue.

* * * * *